(12) United States Patent
Mueller et al.

(10) Patent No.: US 10,151,054 B2
(45) Date of Patent: Dec. 11, 2018

(54) SPACER KNIT FABRIC AND METHOD FOR PRODUCING A SPACER KNIT FABRIC SECTION

(71) Applicant: MÜLLER TEXTIL GMBH, Wiehl-Drabenderhöhe (DE)

(72) Inventors: Stefan Mueller, Wiehl (DE); Frank Mueller, Wiehl (DE)

(73) Assignee: MUELLER TEXTIL GMBH, Wiehl-Drabenderhoehe (DE)

( * ) Notice: Subject to any disclaimer, the term of this patent is extended or adjusted under 35 U.S.C. 154(b) by 144 days.

(21) Appl. No.: 14/777,787

(22) PCT Filed: Mar. 14, 2014

(86) PCT No.: PCT/EP2014/055176
§ 371 (c)(1),
(2) Date: Sep. 17, 2015

(87) PCT Pub. No.: WO2014/146988
PCT Pub. Date: Sep. 25, 2014

(65) Prior Publication Data
US 2016/0273137 A1 Sep. 22, 2016

(30) Foreign Application Priority Data

Mar. 19, 2013 (DE) .......................... 10 2013 102 813

(51) Int. Cl.
*D04B 21/12* (2006.01)
*D04B 21/14* (2006.01)

(52) U.S. Cl.
CPC .............. *D04B 21/12* (2013.01); *D04B 21/14* (2013.01); *D10B 2403/021* (2013.01);
(Continued)

(58) Field of Classification Search
CPC .. D04B 21/12; D04B 21/14; D10B 2403/021; D10B 2403/0213; D10B 2505/08; Y02P 70/633
See application file for complete search history.

(56) References Cited

U.S. PATENT DOCUMENTS 3,918,135 A * 11/1975 Kim ...................... D01D 5/423
139/11
4,025,684 A * 5/1977 Neidhardt ............ A47C 27/081
138/124
(Continued)

FOREIGN PATENT DOCUMENTS

DE 9016062 2/1991
DE 19931193 1/2001
(Continued)

*Primary Examiner* — Danny Worrell
*Assistant Examiner* — Jocelyn Bravo
(74) *Attorney, Agent, or Firm* — Collard & Roe, P.C.

(57) ABSTRACT

A spacer knit fabric if formed with a first two-dimensional knit fabric layer and a second two-dimensional knit fabric layer. The first and the second two-dimensional knit fabric layers are interconnected via knitted spacer threads. The first two-dimensional knit fabric layer has openings formed by a plurality of stitches in each case. Threads of a first thread system, which forms the first two-dimensional knit fabric layer, are connected to each other solely by mutual intertwining. Channels are formed between the first and the second two-dimensional knit fabric layers that are free from spacer threads. The threads of a second thread system, which forms the second two-dimensional knit fabric layer, are connected to one another by intertwining and by at least partial fusion.

5 Claims, 5 Drawing Sheets

(52) U.S. Cl.
CPC .. *D10B 2403/0213* (2013.01); *D10B 2505/08* (2013.01); *Y02P 70/633* (2015.11)

(56) References Cited

U.S. PATENT DOCUMENTS

| | | | | |
|---|---|---|---|---|
| 4,133,191 A * | 1/1979 | Blore | ............... | D04B 1/08 156/148 |
| 5,395,684 A * | 3/1995 | Robinson | ............. | D04B 1/14 428/101 |
| 5,525,700 A * | 6/1996 | Samuels | ............. | C08G 63/605 428/480 |
| 5,735,145 A * | 4/1998 | Pernick | ............... | D04B 1/16 604/378 |
| 6,037,035 A * | 3/2000 | Bottger | ............ | B29C 70/228 428/116 |
| 6,477,865 B1 * | 11/2002 | Matsumoto | ............ | D04B 21/02 66/195 |
| 7,070,845 B2 * | 7/2006 | Thomas | ............. | A43B 13/20 36/29 |
| 7,779,654 B2 * | 8/2010 | Garus | ................ | D04B 21/16 66/195 |
| 7,818,982 B2 * | 10/2010 | Prickett | ........... | A41D 19/01505 2/16 |
| 8,765,253 B1 * | 7/2014 | Smaldone | ............. | D04B 21/16 428/218 |
| 9,445,883 B2 * | 9/2016 | Lecuivre | ............. | D04B 21/12 |
| 2001/0009833 A1 * | 7/2001 | Waldrop | .............. | D03D 15/00 442/184 |
| 2001/0045110 A1 * | 11/2001 | Kolmes | ................ | D04B 1/28 66/174 |
| 2002/0016119 A1 * | 2/2002 | Orita | ................ | D04B 21/16 442/307 |
| 2002/0157429 A1 * | 10/2002 | Matsumoto | ............ | D04B 21/02 66/195 |
| 2003/0106346 A1 * | 6/2003 | Matsumoto | ............ | D04B 21/10 66/195 |
| 2004/0237599 A1 * | 12/2004 | Kondou | ................ | D04B 1/18 66/202 |
| 2006/0059954 A1 * | 3/2006 | Hirayama | ............. | D04B 21/12 66/190 |
| 2006/0207296 A1 * | 9/2006 | Fujikawa | ............. | A47C 31/006 66/202 |
| 2009/0049870 A1 * | 2/2009 | Garus | ................ | D04B 21/16 66/192 |
| 2009/0288731 A1 * | 11/2009 | Chang | ................ | D03D 1/08 139/383 R |
| 2010/0088818 A1 * | 4/2010 | Rock | ................ | A47C 21/046 5/483 |
| 2011/0000264 A1 * | 1/2011 | Prickett | ........... | A41D 19/01505 66/174 |
| 2013/0000011 A1 * | 1/2013 | Vaglio Tessitore | ...... | D04B 1/16 2/93 |
| 2014/0242869 A1 * | 8/2014 | Huang | ................ | D04B 1/18 442/306 |
| 2014/0255643 A1 * | 9/2014 | Koot | ................ | D03D 7/00 428/86 |
| 2015/0099098 A1 * | 4/2015 | Bahukudumbi | ....... | D04B 21/18 428/190 |
| 2015/0194274 A1 * | 7/2015 | Huang | ................ | A41D 1/002 200/61.14 |
| 2015/0313771 A1 * | 11/2015 | Bergstrom | ........ | A61F 13/53708 604/385.101 |

FOREIGN PATENT DOCUMENTS

| | | |
|---|---|---|
| DE | 102006004914 | 8/2007 |
| DE | 102008020287 | 2/2010 |
| DE | 102009013253 | 9/2010 |
| EP | 1184499 | 3/2002 |
| EP | 1775362 | 4/2007 |
| WO | WO2005018363 | 3/2005 |

* cited by examiner

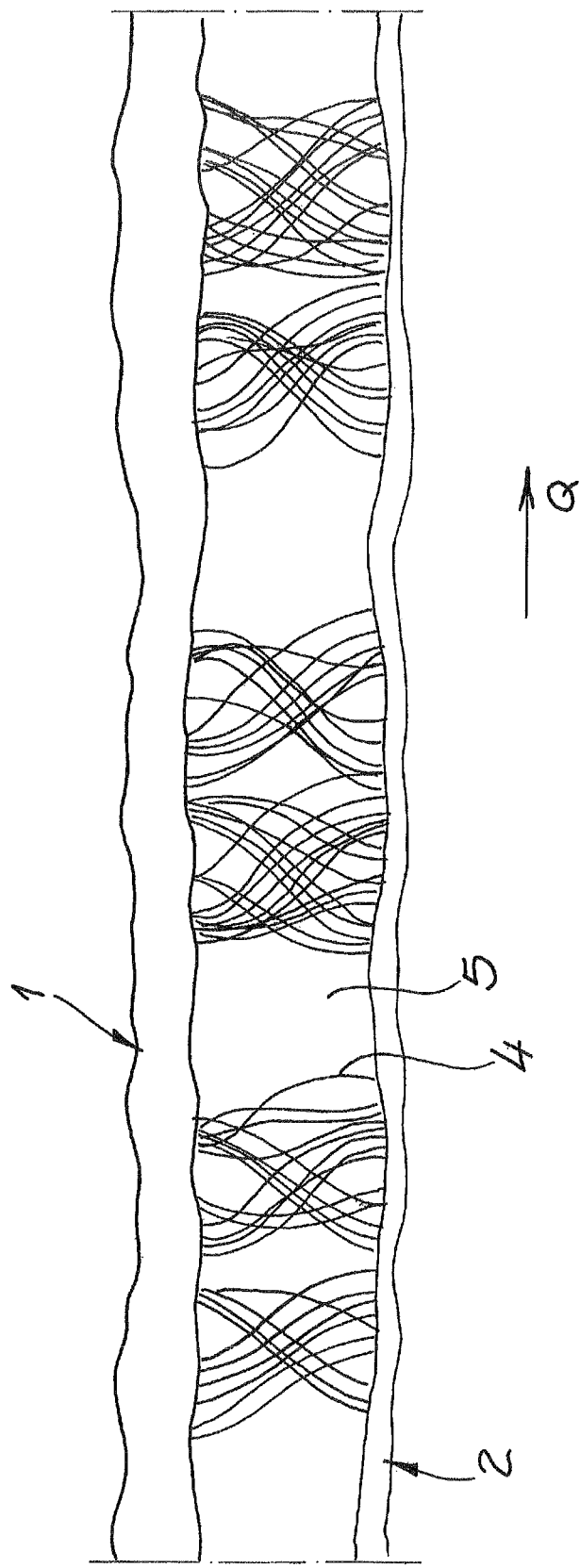

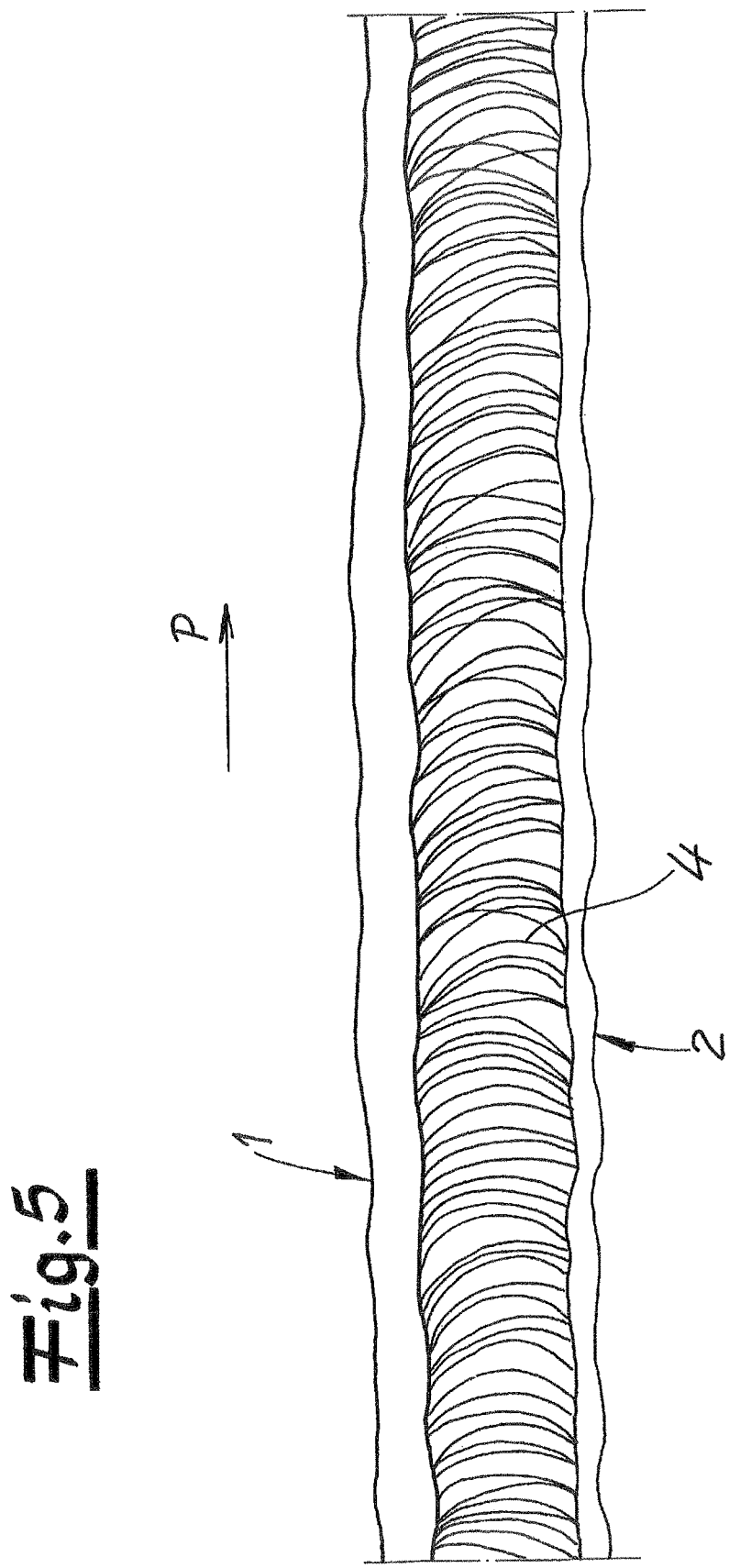

SPACER KNIT FABRIC AND METHOD FOR PRODUCING A SPACER KNIT FABRIC SECTION

CROSS-REFERENCE TO A RELATED APPLICATION

The invention described and claimed hereinbelow is a National Stage Application of PCT/EP2014/055176, filed Mar. 14, 2014 (the PCT application), under 35 USC § 371. The PCT application claims priority from German Patent Application DE 10 2013 102 813.6, filed on Mar. 19, 2013. The German priority application and the PCT application are incorporated herein by reference and provide the basis for a claim of priority of invention.

The present invention relates to a spacer knit fabric comprising a first and a second two-dimensional knit fabric layer which are interconnected via knitted spacer threads, wherein the first knit fabric layer has openings formed by a plurality of stitches in each case, wherein threads of a first thread system, which forms the first knit fabric layer are connected to each other solely by mutual intertwining and wherein channels are formed between the knit fabric layers, which are free from spacer threads.

Spacer knit fabrics are characterized by a light air-permeable structure, where spacer knit fabrics are elastic in the direction of their thickness as a result of the spacer threads running between the two knit fabric layers. As a result of these properties, spacer knit fabrics can be provided as soft, elastic layers which enable air circulation in mattresses, upholstered furniture, items of clothing or shoes. Spacer knit fabrics are also used in the automobile area, for example, for air-conditioned seats and seat covers, where spacer knit fabrics allow a good adaptation to contours as a result of their cushion properties and the very good recovery behaviour. A conventional spacer knit fabric is known from DE 90 16 062 U1.

Despite the per-se already very open air-permeable structure of a spacer knit fabric, particularly when the spacer knit fabric is used for ventilation there is a desire to improve the air permeability between the knit fabric layers or the air guiding properties.

A spacer knit fabric having the features described initially is known from DE 10 2008 020 287 C5. In order on the one hand to achieve a sufficient compressive strength and stability of the spacer knit fabric and on the other hand a uniform, as far as possible resistance-free distribution of air, the spacer knit fabric has intersecting channels running obliquely to the production direction in the layer formed by spacer threads between the knit fabric layers. The known spacer knit fabric has proved successful in practice and utilizes the fact that as a result of the oblique arrangement of the channels, an excessive reduction in the stability is avoided.

Known from EP 1 775 362 A1 is a spacer knit fabric in which channels running in a production direction are formed whereby in the knitting process with a plurality of threads guided parallel to one another, some of the spacer threads are omitted so that open channels running in the production direction are obtained at these defects. However, the strength of the spacer knit fabric at these channels running in the production direction is severely reduced because the spacer knit fabric does not have any stabilization there and the adjoining regions can only make a limited contribution to any load-bearing capacity. A very significant weakening due to the channels specifically also occurs in the transverse direction because when pressure is applied in the transverse direction, the channels running in the production direction completely collapse due to the mobility of the two knit fabric layers or when pulled in the transverse direction, can be pulled appreciably in width. Both the function of the spacer knit fabric and also the handling during processing are thereby appreciably adversely affected.

Comparable restrictions apply when the spacer knit fabric has channels running in the transverse direction which can be produced, for example, whereby the spacer threads are guided at spaced-apart rows of stitches in one of the knit fabric layers in the production direction and no connection between the two knit fabric layers is made there to form a channel.

As is also obtained from EP 1 775 362 A1, in the spacer knit fabrics known from the prior art, longitudinal and transverse channels can be provided to form articulations in order for example to enable a bending of the spacer knit fabric for the purpose of a contour adaptation. However, the channel is compressed and is no longer available for fluid transport.

Known from DE 199 31 193 C2 is a spacer knit fabric for upholstery which has regions of different air permeability. A different density of the material is to be achieved with a uniform structure of the spacer threads which is associated with an appreciable constructive expenditure. In order to configure one of the knit fabric layers to be air-permeable, this can be provided with a film. Alternatively it is also possible to incorporate a melting thread and then melt this to form a closed layer. A specific control of air inside the spacer knit fabric through the formation of continuous channels is not described and conflicts with the approach of a locally different air permeability.

Known from the documents DE 10 2006 004 914 B4 and DE 10 2009 013 253 A1 is the use of threads which melt under the action of heat between the two two-dimensional knit fabric layers of a spacer knit fabric.

According to DE 10 2006 004 914 B4, a stiffening of the material should be accomplished whereby the spacer threads are partially fused with one another. As a result of these measures, the compressive strength of the spacer knit fabric is increased whilst the extensibility in the production and in the transverse direction still remains high.

According to DE 10 2009 013 253 A1, an additional layer is provided between the two knit fabric layers which extends over only a part of the distance between the knit fabric layer and thereby enables a two-stage elastic behaviour.

SUMMARY OF THE INVENTION

The present invention is based on the object of providing a spacer knit fabric which on the one hand has good mechanical properties and on the other hand has an improved air permeability. In particular, in order to improve the handling during the further processing the spacer knit fabric should have a reduced extensibility in the longitudinal and transverse direction and be easy to manufacture.

Starting from a spacer knit fabric having the features described initially, the object is solved according to the invention whereby threads of a second thread system, which forms the second knit fabric layer, are connected to one another by intertwining and by at least partial fusion. The fusion of the threads brings about a stiffening of the second knit fabric layer and thereby a stabilization of the entire spacer knit fabric. The spacer threads and the first knit fabric layer in this case remain soft and mobile. Under a compressive loading however, the channels running between the knit fabric layers are maintained.

The spacer knit fabric is held in a predetermined shape to a certain extent and as it were tensioned by the stiffening of the second knit fabric layer due to fusion of the threads in the plane of the spacer knit fabric. Under a localized loading, the formed channels collapse less strongly with a distribution of the acting forces over a larger area being achieved due to the stiffening of the second knit fabric layer.

The spacer knit fabric can expediently be arranged in base upholstery of a vehicle seat, a mattress or the like in such a manner that the soft first two-dimensional knit fabric layer supported by the spacer threads points in the direction of a user whereas the second knit fabric layer stiffened by the fusion is arranged opposite.

In addition to an improvement in the mechanical properties when using the spacer knit fabric as upholstery material, the handling is also significantly improved. In a non-stiffened spacer knit fabric according to the prior art, there is the problem that the material can stretch considerably in the production direction and in the transverse direction during handling. If therefore, for example, a section of the spacer knit fabric is separated from a web which is under tension, the dimension of the material can vary considerably after removing the tensile stress so that a precise cutting to size or stamping out sections from the web is difficult. This disadvantage can be effectively avoided by stiffening the second knit fabric layer.

The threads of the second knit fabric layer are melted to such an extent and fused with one another so that they can no longer move with respect to one another. As a result of the thread guidance during the knitting, both different longitudinal sections of the same thread and adjacent mutually intertwined threads can be fixed. However, the fusion is accomplished in such a manner that the threads retain their basic thread structure and are not completely fused. The desired degree of fusion can usually be adjusted sufficiently accurately by the heat supply.

Furthermore however, it is also possible to use different materials for the second knit fabric layer.

During the knitting process, the first knit fabric layer, the second knit fabric layer and the spacer threads in between are formed with a plurality of rows of needles with a plurality of parallel-guided threads in each case, where wales or warp strands running in the production direction and rows of stitches running in the transverse direction, following one another in the production direction are formed.

According to a preferred embodiment of the invention, channels are provided at least along the production direction, which can be produced in a particularly simple manner by omitting spacer threads. In particular, the channels can be formed in a uniform grid in each case by omitting at least one spacer thread running in production direction. Thus, for example, it is possible to omit every second, every third, every fourth or every fifth spacer thread in order to produce a channel there. Additionally or alternatively, channels can thereby also be formed in the transverse direction whereby the spacer threads are guided on spaced-apart rows of stitches, preferably in a uniform grid in one of the two knit fabric layers in the production direction.

The arrangement of the longitudinal or transverse channels in a fixed grid with a uniform distance between the channels and a uniform channel width is however not compulsory.

Thus, both in the case of longitudinal channels and also in the case of transverse channels it is readily possible to vary the width of the channels and the distance from channel to channel. In order, for example, to produce an enlarged channel width in the case of longitudinal channels, two or more successive spacer threads in the transverse direction can be omitted. The distance between two longitudinal channels is obtained on the other hand from the number of interposed spacer threads. As a result of such a variation, there is initially the possibility of being able to adjust the mechanical properties of the spacer knit fabric even more accurately. Furthermore, it is also possible to be able to match the spacer knit fabric more precisely to its subsequent intended application. Thus, for example, it is feasible that in subregions of the spacer knit fabric, a greater hardness is advantageous and in other subregions a greater ventilation is advantageous where these requirements can be satisfied by an adapted arrangement and configuration of the channels. Optionally, when separating individual sections from the spacer knit fabric, a pattern repeat and/or alignment should then be taken into account.

Accordingly, the channel width and the distance between two successive channels in the transverse direction can be varied almost arbitrarily in the case of longitudinal channels. The same applies to the formation of transverse channels. In principle however, a sequence of a varying channel width or a varying channel spacer which is repeated over a certain running width in the transverse direction or longitudinal direction is also possible.

According to the invention, the particularly simple configuration of longitudinal and transverse channels with regard to production is also possible without the material being excessively weakened thereby. A collapse of the channels under a lateral pressure, an excessive stretching of the channels under tension and a complete compression of the channels under a localized pressure perpendicular to the extension of the spacer knit fabric can be avoided by the stiffening of the second knit fabric layer.

The present invention relates to a spacer knit fabric in which the first knit fabric layer has openings formed by a plurality of stitches in each case. During the knitting process stitches are formed which follow one another successively in the production direction and continuously along the rows of stitches in the transverse direction. The openings here form a structuring which extends over a plurality of stitches at least in the production direction.

In a preferred embodiment of the invention, the second knit fabric layer also has openings. The stiffened second knit fabric layer then forms a type of grid structure which stabilizes the entire spacer knit fabric in the manner described.

The openings of the first knit fabric layer and the second knit fabric layer are formed by fitting the spacer knit fabric, that is by aligning the spacer knit fabric under tension and whilst supplying heat in such a manner that in a plan view of the spacer knit fabric the openings of the first knit fabric layer are offset with respect to the openings of the second knit fabric layer.

In order to mutually fuse the threads of the second thread system, according to a preferred embodiment of the invention it is provided that the second thread system comprises at least one thread type which has a lower melting point than the threads of the first thread system and a lower melting point than the spacer threads. It is then possible to heat the entire spacer knit fabric, for example, by means of hot air, to a temperature at which only the threads having the lower melting point fuse. Within the framework of such process guidance, an accidental stiffening of the remaining threads can be avoided.

It is furthermore preferred if the second thread system comprises a multifilament yarn. The second thread system can in principle comprise various threads or yarns. If the second thread system contains different yarns, at least one multifilament yarn contained therein has a lower melting point. Specifically multifilament yarns can be efficiently stiffened by melting the individual filaments because the filaments which are initially mobile with respect to one another then fuse to form a continuous stiff strand.

As already explained previously, the melting threads or yarns of the second thread system should bring about a connection with one another without the further thread system completely losing its structure. Usually these specifications can be adjusted by a suitable heat supply. However, further measures are also possible in order to meet these specifications. Firstly it is feasible that the melting threads of the second thread system or at least one further thread of the second thread system have a certain shrinkage. The threads are then tautened by a supply of heat whereby connection of the melted or partly melted surfaces is facilitated. Furthermore, a particularly rigid, uniform structure is produced.

If the second thread system comprises a multifilament yarn, the multifilament yarn can also comprise filaments of different material. This can comprise filaments of the same base polymer which however have a different melting point. By using filaments of different material in this sense, it is possible that at a suitable temperature, only some of the filaments melt and bring about an intimate connection whilst the other filaments ensure the structural integrity of the threads.

A similar effect can be achieved if the second thread system contains a bicomponent yarn. The bicomponent yarn can, for example have a usual sheath-core structure. By selecting suitable materials and selecting a suitable temperature, it can in particular be achieved that only the sheath melts whilst the core of the bicomponent yarn avoids complete melting and therefore a loss of structure. A corresponding material is described, for example, in DE 10 2006 004 914 B4 for spacer threads.

The spacer knit fabric according to the invention is preferably fabricated from polyester, in which case preferably at least one thread made of polyester having a lower melting point is used for the second thread system. Particularly preferably this is a copolyester. In principle however, it is possible to use at least one thread made of polyolefin, in particular polyethylene or polypropylene for the second thread system because polyolefins have a comparatively low melting point.

Preferably the second knit fabric layer is stiffened in the entire plane by melting in order to avoid weak spots.

The subject matter of the invention is also a method for producing a spacer knit fabric section comprising the steps:

producing a knit fabric web by knitting a first two-dimensional knit fabric layer provided with openings from a first thread system, a second two-dimensional knit fabric layer provided with openings from a second thread system and spacer threads between the first knit fabric layer and the second knit fabric layer, omitting individual spacer threads during the knitting process to form channels running in a production direction and/or guiding the spacer threads on spaced-apart rows of stitches in one of the two knit fabric layers to form transverse channels, supplying heat for melting at least a part of the threads of the second thread system, fusing at least some of the threads of the second thread system, stiffening the second knit fabric layer by cooling, separating the spacer knit fabric section from the knit fabric web.

The spacer knit fabric described previously can be produced by the method described. At this point, it should be noted that the second knit fabric layer is stiffened appreciably by the fusion of at least some of the threads so that a bending or kinking of the spacer knit fabric around the stiffened second knit fabric layer is not readily possible. Thus, according to a preferred further development of the method, it is provided that before separation of the spacer knit fabric, the knit fabric web is rolled onto a roll and unrolled again, wherein during the rolling up, the stiffened knit fabric layer is arranged so that it lies outside in the individual windings, where then the respective first knit fabric layer lying on the inside can be compressed sufficiently as a result of its mobility.

Since the second knit fabric layer is stiffened according to the invention, cutting or stamping can also take place under tension without the spacer knit fabric sections thereby formed being deformed uncontrollably after eliminating the tensile force. In particular, spacer knit fabric sections having their final desired dimensions can thus be stamped out directly and without taking into account any stretching from the knit fabric web which is usually present as an endless web. There is also the advantage that due to the stiffening of the second knit fabric layer, low tensile forces are also sufficient during handling of the knit fabric web because this already has an appreciable intrinsic strength. As a result of the stiffened second knit fabric layer, a smooth or straight drawing of the knit fabric web is not required.

The supply of heat provided by the method according to the invention can particularly preferably be provided by hot air. According to the above explanations on the spacer knit fabric, the second thread system comprises at least one thread type which melts first so that with a suitable temperature control, only this thread type partly melts or melts in order to achieve fusion in the second knit fabric layer.

The supply of heat for fusion can also be accomplished by contact for which the spacer knit fabric for example can be guided through a roller gap. If only the roller which abuts against the second knit fabric layer is heated, with suitable temperature guidance even the first knit fabric layer and the second knit fabric layer can be formed from identical threads or at least from threads having a comparable melting point. Instead of a roller gap with two rollers, a combination of one roller and a smoothing belt running around at least a part of the circumference of the roller is also possible in order to vary the duration of the temperature effect and the pressing force.

Furthermore, other heat sources for supplying the heat required for melting are feasible. In particular, the heating can also be accomplished by radiant heat such as infrared radiation. If the second knit fabric layer is facing a corresponding radiation source, at least a stronger heating can be expected there. Optionally, the thread to be melted of the thread system forming the second knit fabric layer can also be provided with additives which enable energy absorption. With regard to the absorption of infrared radiation, for example, a dye is suitable in order to facilitate melting.

The spacer knit fabric is usually subjected to a so-called fitting in which the material is aligned under tension and where a certain amount of heat is supplied. In particular, the fitting can be used to arrange the superposed knit fabric layers in the longitudinal and transverse direction in a suitable manner with respect to one another. For example, a lateral tilting between the knit fabric layers can be compensated in order to increase the stability of the spacer knit fabric.

The melting of some of the threads of the second thread system and the fusion thereof can be accomplished both during the step for fitting known per se or also in a downstream process step.

In particular, if the melting of some of the threads of the second thread system is accomplished in a downstream process step, a different heating can be accomplished over a surface section of the spacer knit fabric. Thus, for example, it is possible to stiffen only individual subregions by melting or to select the degree of stiffening differently in sections.

The spacer knit fabric according to the invention is in particular provided for base upholstery of air-conditioned seats where however the spacer knit fabric is suitable for base upholstery of mattresses and mattress covers.

BRIEF DESCRIPTION OF THE DRAWINGS

The invention will be explained hereinafter with reference to drawings showing merely one exemplary embodiment. In the figures:

FIG. 4 shows a cross-section through the spacer knit fabric of FIG. 1, FIG. 5 shows a longitudinal section through the spacer knit fabric according to FIG. 1.

DETAILED DESCRIPTION OF THE INVENTION

Figure 1:
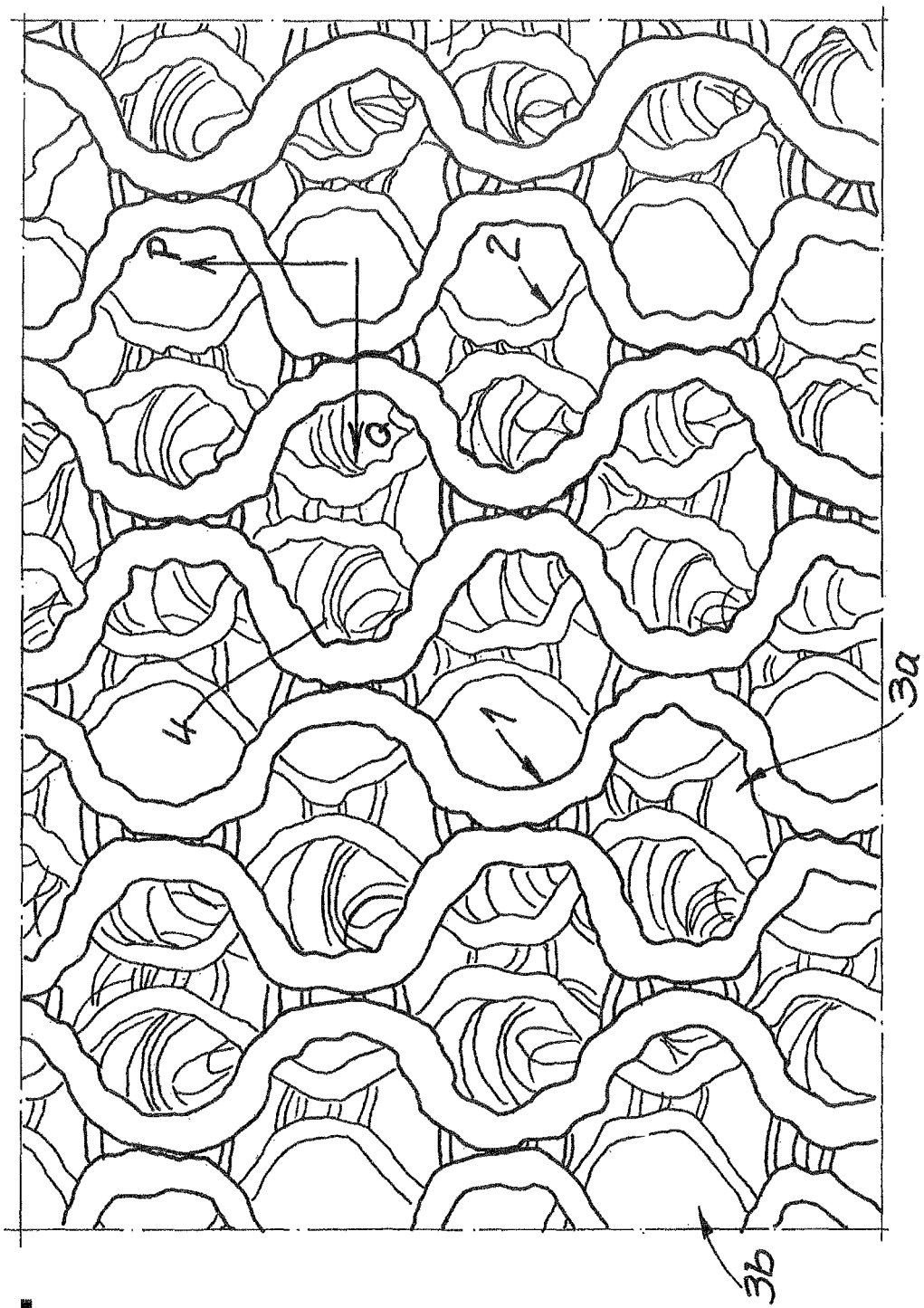
FIG. 1 shows a section of a spacer knit fabric in a plan view.

FIG. 1 shows in a plan view a spacer knit fabric comprising a first knit fabric layer 1 located above in the diagram and a second knit fabric layer 2 located underneath.

Both the first knit fabric layer 1 and also the second knit fabric layer 2 each have openings 3a, 3b which are each formed by a plurality of stitches in the knitting process. In FIG. 1 and in particular in the sectional views of FIGS. 4 and 5 it can be seen that the first knit fabric layer and the second knit fabric layer 3 are connected to one another by spacer threads 4.

During the production of the spacer knit fabric, rows of stitches running in a transverse direction Q are formed continuously in a production direction P.

It can be seen from FIG. 5 that the spacer threads 4 are curved by incorporation into the first knit fabric layer 1 and the second knit fabric layer 2 in the production direction P.

In the cross-section of FIG. 4 it can additionally be seen that spacer threads 4 running in production direction P are omitted between the two knit fabric layers 1, 2 so that channels 5 running in production direction P are formed which for example enable a free passage of air when the spacer knit fabric is used for ventilation.

Figure 2:
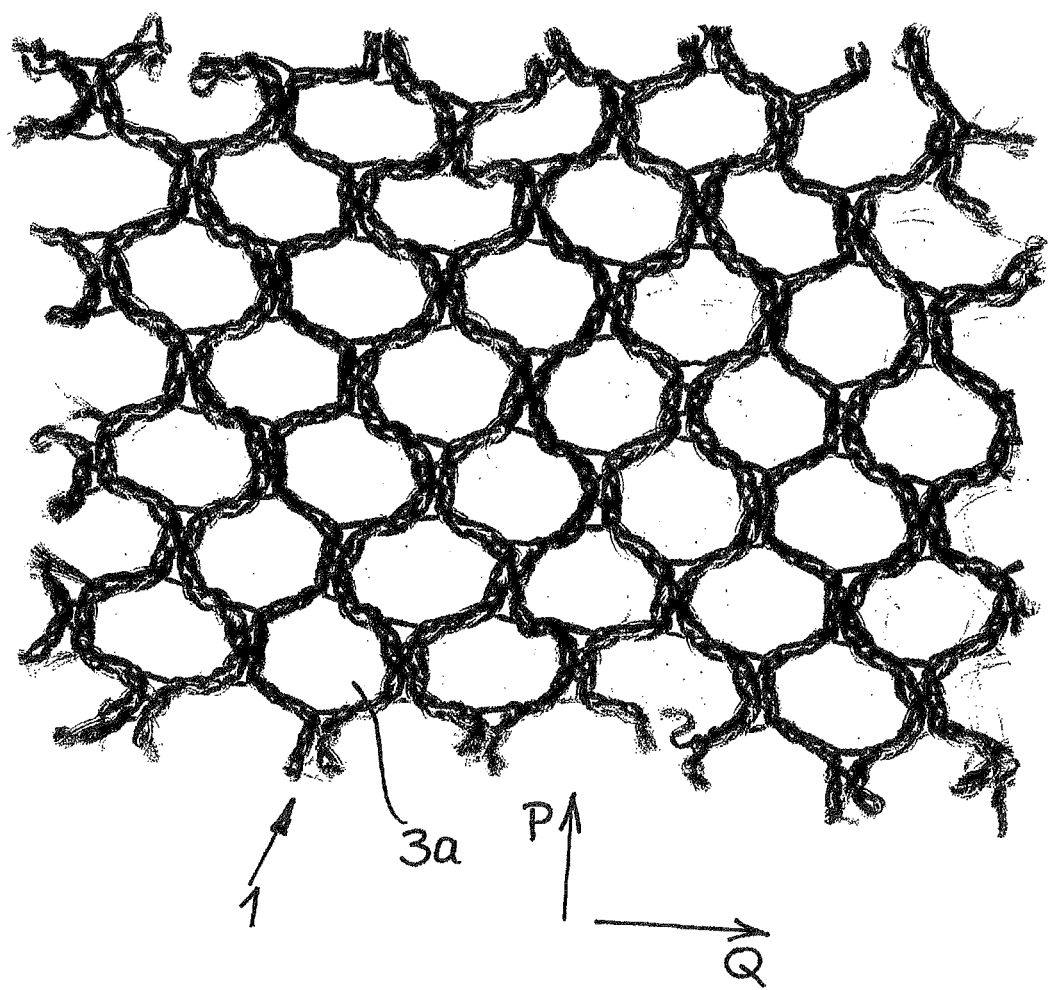
FIG. 2 shows a view of a first two-dimensional knit fabric layer of the spacer knit fabric shown in FIG. 1.
Figure 3:
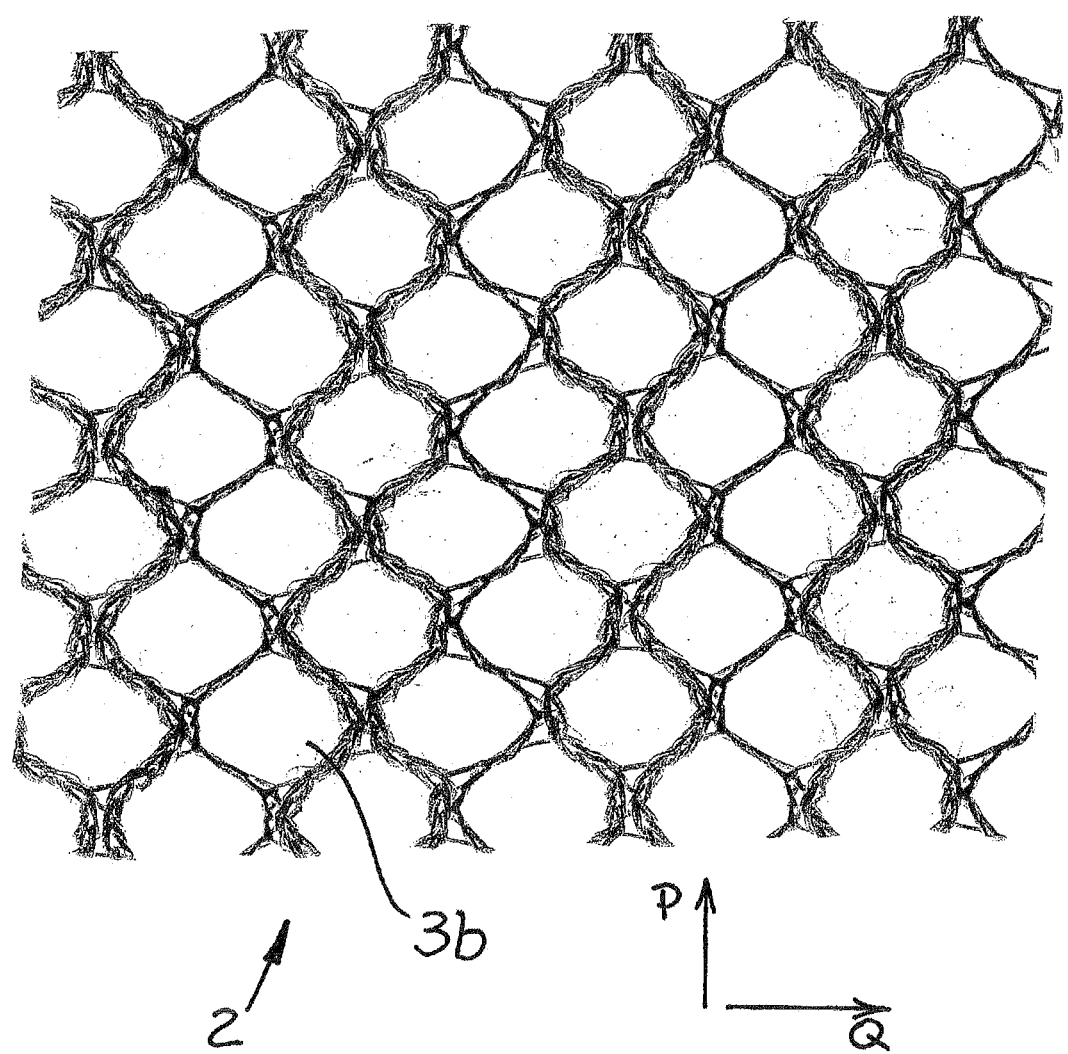
FIG. 3 shows a view of a second two-dimensional knit fabric layer of the spacer knit fabric shown in FIG. 1.

FIGS. 2 and 3 show the first knit fabric layer (FIG. 2) and the second knit fabric layer 2 (FIG. 3) after cutting through the spacer threads 4.

It can be deduced from a comparative analysis that the first knit fabric layer 1 overall has a looser, soft structure. The threads of a thread system forming the first knit fabric layer 1 are only connected to one another by a mutual intertwining.

In contrast to this, the second knit fabric layer 2 according to FIG. 3 has a stiffer structure. This is achieved by threads of a thread system forming the second knit fabric layer 2 being connected to one another both by an intertwining and also by a partial fusion. The second knit fabric layer 2 thus forms a comparatively stiff, stable grid structure.

It can also be seen in FIG. 2 that the openings 3a each formed by a plurality of stitches have deformed without the support of the second knit fabric layer 2 via the spacer threads whilst the grid structure formed by the second knit fabric layer 2 is comparatively strong and stable. A certain tautening by the fusion of at least some of the threads in the second knit fabric layer 2 can also be seen in FIG. 4, after which the second knit fabric layer 2 has a low thickness due to the tautening and due to the fusion.

The second knit fabric layer 2 thus forms a stabilizing base structure of the spacer knit fabric where specifically a compression or a tension in transverse direction Q does not result in any deformation of the spacer knit fabric (see FIG. 4). Even if the first knit fabric layer 1 (FIG. 2) cannot withstand such tensile or compressive forces, the stiff second knit fabric layer 2 (FIG. 3) brings about a fixing.

In the exemplary embodiment shown, the first knit fabric layer 1 and the second knit fabric layer 2 are each formed from a two-thread system where one of the threads forms stitches and where the other thread connects the formed stitches to one another in the form of a weft thread. Whereas in the first knit fabric layer 1, the threads described are movable despite the intertwining, as a result of the fusion in the second knit fabric layer 2 the structure is stiffened and therefore "frozen in" to a certain extent.

With reference to FIG. 4, it is achieved as a result of the stiffening that the channels 5 running in production direction P are maintained under a lateral pressure or even under a pressure in the direction of the thickness.

The invention claimed is:

1. A spacer knit fabric comprising:
a first generally planar knit fabric layer; and
a second generally planar knit fabric layer;
wherein the first and the second generally planar knit fabric layers are interconnected via knitted spacer threads;
wherein the first generally planar knit fabric layer has openings formed by a plurality of stitches throughout the first generally planar knit fabric layer;
wherein threads of a first thread system, which forms the first generally planar knit fabric layer, are connected to each other solely by mutual intertwining;
wherein channels are formed between the first and the second generally planar knit fabric layers that are free from spacer threads, said channels running in a production direction;
wherein the channels are formed in a uniform grid throughout the spacer knit fabric by omitting a spacer thread running in the production direction,
wherein threads of a second thread system, which forms the second knit fabric layer, are connected to one another by intertwining and by at least partial fusion, and
wherein the second thread system comprises at least one thread type that has a lower melting point than the threads of the first thread system and the spacer threads, such that application of heat at a specified temperature to the entire spacer knit fabric fuses the threads of the thread type having the lower melting point and stiffens the second fabric layer, with no fusion of the first fabric layer or spacer threads.

2. The spacer knit fabric according to claim 1, wherein the second knit fabric layer has openings formed by a plurality of stitches throughout the second knit fabric layer.

3. The spacer knit fabric according to claim 1, wherein the second thread system comprises a multifilament yarn.

4. The spacer knit fabric according to claim 3, wherein the multifilament yarn comprises filaments of at least two materials that are different from each other.

5. The spacer knit fabric according to claim 1, wherein the second thread system contains a bicomponent yarn.

\* \* \* \* \*